US012455122B2

(12) United States Patent
O'Connell et al.

(10) Patent No.: US 12,455,122 B2
(45) Date of Patent: Oct. 28, 2025

(54) DYNAMICALLY ENHANCING HEAT TRANSFER THROUGH HEAT PIPES

(71) Applicant: International Business Machines Corporation, Armonk, NY (US)

(72) Inventors: Kevin O'Connell, Mantorville, MN (US); Phillip V. Mann, Rochester, MN (US); William James Anderl, Rochester, MN (US); Alexander Matos, Rochester, MN (US); Brenda Berg, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 219 days.

(21) Appl. No.: 18/341,305

(22) Filed: Jun. 26, 2023

(65) Prior Publication Data
US 2024/0426558 A1    Dec. 26, 2024

(51) Int. Cl.
*F28F 1/32*    (2006.01)

(52) U.S. Cl.
CPC ..................................... *F28F 1/32* (2013.01)

(58) Field of Classification Search
CPC .................................. F28F 1/32; F28D 15/06
See application file for complete search history.

(56) References Cited

U.S. PATENT DOCUMENTS

| | | | |
|---|---|---|---|
| 3,812,905 A * | 5/1974 | Hamerdinger | F28D 15/06 165/274 |
| 3,934,643 A | 1/1976 | Laing | |
| 4,664,177 A | 5/1987 | Edelstein | |
| 9,188,396 B2 | 11/2015 | Kameoka | |
| 2007/0251673 A1* | 11/2007 | Hou | F28D 15/046 165/146 |
| 2010/0218496 A1 | 9/2010 | Miles | |
| 2014/0041838 A1* | 2/2014 | Lin | H01L 23/467 165/104.21 |
| 2022/0316764 A1 | 10/2022 | Eadelson | |
| 2023/0026517 A1 | 1/2023 | Oda | |

FOREIGN PATENT DOCUMENTS

| | | | | |
|---|---|---|---|---|
| CN | 107144035 B | | 6/2019 | |
| JP | 02093293 A | | 4/1990 | |
| JP | 04268193 A | | 9/1992 | |
| JP | 2003148882 A | * | 5/2003 | ......... F28D 15/0266 |

* cited by examiner

*Primary Examiner* — Tavia Sullens
*Assistant Examiner* — Khaled Ahmed Ali Al Samiri
(74) *Attorney, Agent, or Firm* — Kimberly Zillig

(57) ABSTRACT

A heat pipe system, method, and heat sink system to enhance heat transfer from a heat-generating component. The method includes generating heat with the heat-generating component. The method also includes transferring at least a portion of the heat to at least a portion of a volatile fluid within one or more heat pipes. The method further includes modifying, dynamically, an active heat transfer region of the one or more heat pipes, thereby dynamically modulating heat transfer from the heat-generating component through the one or more heat pipes.

19 Claims, 12 Drawing Sheets

DYNAMICALLY ENHANCING HEAT TRANSFER THROUGH HEAT PIPES

BACKGROUND

The present disclosure relates to heat transfer from objects, and more specifically, to enhancing heat transfer from heat-generating components through heat pipes.

Many known modern processors include high-performance central processing units (CPUs) are configured to execute multiple parallel operations simultaneously. Such known processors tend to increase the power consumption over that of their predecessors. As such, heat generation also tends to increase and the heat needs to be removed to allow the respective processors to operate at their design capacities within the design temperature parameters. Many of these known processors use one or more heat pipes affixed to the external surfaces of the processors as the heat sinks to remove the generated heat. Many known heat pipes are sealed at manufacturing and utilize two primary paths which facilitate sufficient heat transfer from the respective processor.

SUMMARY

A heat pipe system, method, and heat sink system are provided for enhancing heat transfer from heat-generating components through heat pipes.

In one aspect, a heat pipe system to enhance heat transfer from a heat-generating component is presented. The heat pipe system includes one or more heat pipes. Each heat pipe of the one or more heat pipes includes an outer shell and a wick structure coupled to the outer shell. At least a portion of the wick structure defines a chamber therein and the chamber includes an evaporator portion and a condenser portion. The heat pipe system also includes one or more vapor blocking devices positioned in the chamber. Each vapor blocking device of the one or more vapor blocking devices is configured to dynamically modify an active heat transfer region of the condenser portion, thereby dynamically modulate heat transfer through the condenser portion. Accordingly, the heat pipe system facilitates enhanced heat transfer from heat sources through dynamically adjusting the heat transfer capabilities of the affected heat pipe automatically, thereby enhancing the dynamic modulating of the heat transfer capabilities of the respective heat pipe.

In another aspect, method to enhance heat transfer from a heat-generating component is presented. The method includes generating heat with the heat-generating component. The method also includes transferring at least a portion of the heat to at least a portion of a volatile fluid within one or more heat pipes. The method further includes modifying, dynamically, an active heat transfer region of the one or more heat pipes, thereby dynamically modulating heat transfer from the heat-generating component through the one or more heat pipes. Accordingly, the method facilitates enhanced heat transfer from one or more heat sources through dynamically adjusting the heat transfer capabilities of the affected heat pipes automatically, thereby enhancing the dynamic modulating of the heat transfer capabilities of the respective heat pipe.

In yet another aspect, a heat sink system to enhance heat transfer from a heat-generating component is presented. The heat sink system includes one or more heat pipes. Each heat pipe of the one or more heat pipes includes an outer shell and a wick structure coupled to the outer shell. At least a portion of the wick structure defines a chamber therein, and the chamber includes an evaporator portion and a condenser portion. The heat sink system also includes one or more vapor blocking devices positioned in the chamber. Each vapor blocking device of the one or more vapor blocking devices is configured to dynamically modify an active heat transfer region of the condenser portion, thereby dynamically modulate heat transfer through the condenser portion. The heat sink system also includes one or more cooling fins thermally coupled to the one or more heat pipes. Accordingly, the heat sink system facilitates enhanced heat transfer from one or more heat sources through dynamically adjusting the heat transfer capabilities of the affected heat pipes automatically, thereby enhancing the dynamic modulating of the heat transfer capabilities of the respective heat pipe.

The present Summary is not intended to illustrate each aspect of, every implementation of, and/or every embodiment of the present disclosure. These and other features and advantages will become apparent from the following detailed description of the present embodiment(s), taken in conjunction with the accompanying drawings.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are illustrative of certain embodiments and do not limit the disclosure.

Figure 1A:
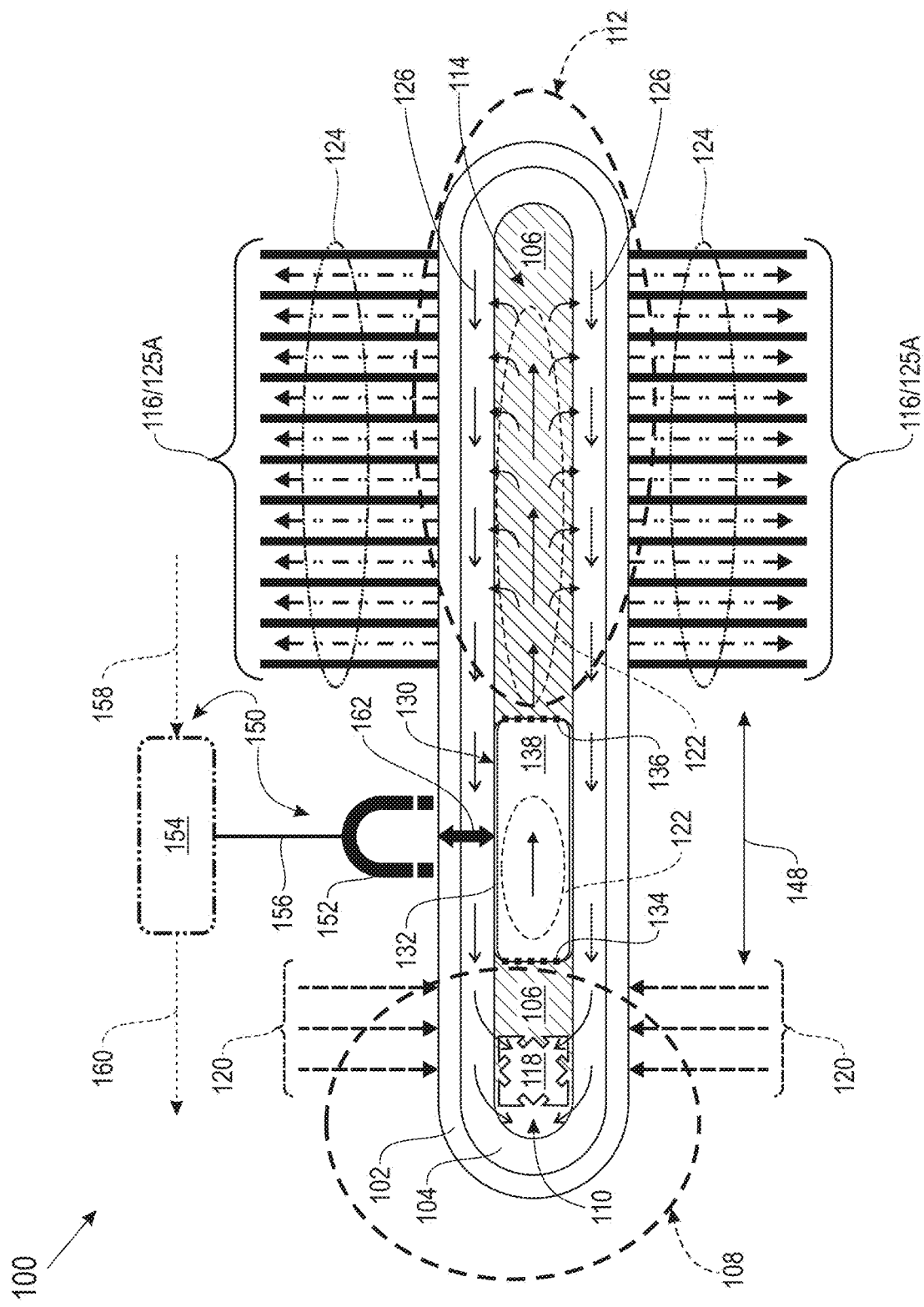
FIG. 1A is a schematic diagram of a heat pipe system including a dynamically positionable hollow sleeve in a first position, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure relate to implementing a heat pipe system, method, and heat sink system for enhancing heat transfer from heat-generating components through heat pipes. While the present disclosure is not necessarily limited to such applications, various aspects of the disclosure may be appreciated through a discussion of various examples using this context.

It will be readily understood that the components of the present embodiments, as generally described and illustrated in the Figures herein, may be arranged and designed in a wide variety of different configurations. Thus, the following details description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "at least one embodiment," "one embodiment," "another embodiment," "other embodiments," or "an embodiment" and similar language means that a particular feature, structure, or characteristic described in connection with the embodiment is included in at least one embodiment. Thus, appearances of the phrases "a select embodiment," "at least one embodiment," "in one embodiment," "another embodiment," "other embodiments," or "an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

As used herein, "facilitating" an action includes performing the action, making the action easier, helping to carry the action out, or causing the action to be performed. Thus, by way of example and not limitation, instructions executing on one processor might facilitate an action carried out by semiconductor processing equipment, by sending appropriate data or commands to cause or aid the action to be performed. Where an actor facilitates an action by other than performing the action, the action is nevertheless performed by some entity or combination of entities.

Many known modern processors include high-performance central processing units (CPUs) and are configured to execute multiple parallel operations simultaneously. Such known processors tend to increase the power consumption over that of their predecessors. As such, heat generation also tends to increase and the heat needs to be removed to allow the respective processors to operate at their design capacities within the design temperature parameters. Many of these known processors use one or more heat pipes affixed to the external surfaces of the processors as the heat sinks to remove the generated heat. In addition, the use of heat pipes are prevalent through heating and ventilation and air-conditioning (HVAC) systems for energy recovery because they require little to no power. They are also used for thermal control of satellites and spacecraft.

As the power requirements for computing continue to increase, the computing industry is continually tasked with dissipating the associated increases in heat output commensurate with the increased power requirements, while reducing, or at least, mitigating any increase of cost, and also improving the efficiency of heat removal. Many known heat pipes are sealed at manufacturing and utilize two primary paths which facilitate sufficient heat transfer from the respective processor. At least most known heat pipe-based heat sinks provide a single design heat removal point throughout the expected lifetime of the heat pipe. However, many known modern processors are cycled through periods of high workload and low workload; therefore, most known heat pipes are not designed for both low and high power outputs, and as such, most known heat pipes are designed with a sub-optimized performance across most of the spectrum of power draws and heat generation. More specifically, many known heat sinks using heat pipes are most efficient only in a narrow band of the design operational spectrum of the respective heat-generating component.

In general, heat pipes utilize two primary paths which facilitate a significant amount of heat transfer away from the object to be cooled. Such heat pipes are filled with a volatile liquid designed for the range of expected heat removal from the respective heat sources. Therefore, the first path includes a vapor flow path that includes a liquid-to-vapor evaporator section that is typically directly, mechanically coupled to the heat source. The liquid is evaporated into a vapor that traverses the length of the first path a high speeds (i.e., near sonic velocities) to a condenser section that removes the heat energy in the vapor state to condense the vapor back into the liquid state. The heat removal from the vapor includes conduction into external heat fins and convection into the local environment. The condensed vapor in the liquid state flows back to the evaporator section through the inside walls of the heat pipe in a wick path through capillary action. Such mechanisms facilitate steady state heat transfer in through a two-phase evaporation-condensation cycle.

In some embodiments, a plurality of the described heat pipes are routinely used with a single heat sink, and in some embodiments, multiple heat pipes used for a single heat generating device. Therefore, in some instances where multiple heat pipes are used in a single heat sink, it is desirable to have more effective and efficient heat removal in some regions of the heat sink rather than others in order to more effectively cool components both in contact with the heat sink and within the more expansive system which the heat sink resides. For example, a heat sink using multiple heat pipes is used to remove heat generated by a multi-core processing device resident within a server cabinet.

At least one know method to enhance heat pipe operation includes a flattened heat pipe with a wick structure, where a thickness of the wick structure is changed so as to be thicker in a high-temperature portion where an exothermic element is disposed than in a low-temperature portion where none of the exothermic elements are disposed (see U.S. Pat. No. 9,188,396). However, such a flattened heat pipe has a fixed configuration that is not configured for dynamic changing.

Some known heat transfer systems use transport of heat by liquid-vapor phase change of a working fluid. Some of these system include using temperature-controlled flow modulation valves to independently control the flow of working fluid into and out of each respective heat exchanger in response to the heat load thereon (see U.S. Pat. No. 4,664,177).

At least some known cooling systems (see U.S. Patent Publication number 2022/0316764) use multiple cooling interfaces, i.e., any devices that may absorb heat from a heat source (e.g., electronic components) through direct contact or indirect contact, and through one or more fluid flow channels. Each of the cooling interfaces may include a liquid coolant inlet, a gas or vapor coolant outlet, and an inlet shut-off valve to control the flow of liquid coolant into the cooling interface. The system may further comprise a condenser. The liquid coolant may flow from the condenser, through a channel, to the liquid coolant inlet. The inlet shut-off valve may block the liquid coolant from entering the cooling interface or may permit the liquid coolant to enter the cooling interface. The cooling interface may be in contact with a heat source and heat may be transferred from the heat source to the liquid coolant. The liquid coolant may be vaporized and may exit the cooling interface through the gas coolant outlet to be directed to the condenser. In some embodiments, the cooling system may include one or more outlet shut-off valves that may aid in controlling the amount of coolant in the cooling interface and the pressure of the cooling interface, thereby maintaining the temperature of the heat source.

Some known embodiments of heat pipes include a control mechanism to modulate the flow of heat within the pipe (see U.S. Patent Publication number 2010/0218496). The control mechanism may comprise a thermal valve in the form of a rotatable circular plate which, depending on its position, allows, impedes, or obstructs the flow of vapor in the pipe thus effectively providing a means for modulating heat flow within the pipe.

Other known heat pipes control the heating medium flow rate by means of the movement of a magnetic fluid brought about by the movement of a magnetic flux generating part (see Japanese Patent Publication number JP-H0293293-A). A continuous array-type electromagnet comprising first to fourth electromagnets disposed around the exterior of the evaporator section and the heat insulator section of the pipe body proper, while a magnetic fluid is sealed inside the pipe body proper. When the electromagnets are OFF, the magnetic fluid is positioned in the lower part of the evaporator section due to its own weight to settle in the bottom, where the heat transfer takes place by means of the circulation of the heating medium. In order to stop the heat transfer, the first to fourth electromagnets are sequentially turned ON from the lower one to the upper one, thereby controlling a thermal flow by movement of the magnetic fluid accompanying movement of the magnetic flux generating part.

Some known heat transfer mechanisms maintain the temperature of a heat pipe within a certain range by controlling heat transfer resistance (see Japanese Patent Publication number JP-H04268193-A). The arrangement is such that a sealed container made from shape memory alloy, a wick made from shape memory alloy, an actuation liquid, and a rubber ring are provided. When the temperature falls, the shape in the center of a heat pipe is changed by elastic forces of the ring to narrow a passage. As a result, flow of vapor is controlled and heat transfer resistance at low temperature increases.

Other known heat transfer mechanisms (see Chinese Patent Publication CN-107144035-A) for geothermal energy extraction include a sleeve-type loop heat pipe that includes an evaporation section, an adiabatic section, and a reflux section. The evaporation section is located in the high-temperature heat storage. The surface heat exchanger is equipped with a condensation section. The condensation section exchanges heat with the outside. A one-way vale is provided between the adiabatic section and the condensation section. A valve or a steam pump, and a one-way throttle valve is set between the storage tank and the return section. The evaporation section, the adiabatic section, the condensation section, the storage tank, and the return section are connected end to end, and the working fluid in the storage tank passes through the return flow. The liquid working fluid return enters the evaporation section, and the liquid working fluid after entering the evaporation section absorbs heat and produces film boiling. Control of the liquid phase reflux mode and boiling mode of the evaporation section are controlled by passing the working fluid of the liquid storage tank through the reflux section, and this can adjust the effective liquid filling rate of the geothermal heat pipe in real time, thereby achieving stable and efficient extraction of geothermal energy.

Accordingly, there is a need in the computing industry to better dynamically modulate the heat transfer capabilities of the respective heat sink devices.

A heat pipe system, method, and heat sink system are disclosed and described herein for enhancing heat transfer from heat-generating components through heat pipes. In at least some of the embodiments described herein, the vapor path within a heat pipe is dynamically altered to adjust the localized heat flux in a manner that enhances component cooling in an electronics enclosure. Specifically, the present disclosure presents an improved, dynamic heat pipe system that adjusts its active heat transfer regions to direct the transfer of heat to the most appropriate section, or sections, of heat fins. More specifically, mechanisms to modulate the vapor's transport across a heat pipe chamber results in modifying the active heat transfer region of the heat pipe through at least one of blocking the vapor from selected portions of a condenser, or insulating a portion of the condenser from the vapor. Such mechanisms include dynamic, real-time positioning of devices within the heat pipe chamber to dynamically respond to changes in workload shifts across cores in a modern multi-core processor, including increases and decreases of processing activity for a particular core, as well as across multi-chip modules.

In addition, as presented herein, the repositioning of devices in the chamber changes the total volume of the heat pipe chamber that impacts the effective fill ratio (sometimes referred to as filling ratio) for a fixed mass of the volatile fluid resident in the heat pipe. As used herein, the fill ratio is defined as the volume of liquid presently in the heat pipe as compared to the volume of the evaporator section. As the fill ratio increases from for example, and without limitation, from dry (approximately 0%, i.e., substantially all of the liquid has been vaporized in the evaporator section) to approximately 85%, the thermal resistance to heat transfer decreases, thereby facilitating high heat transfer rates at lower differential temperatures between the object being cooled and the localized environment. As the fill ratio increases from approximately 85% to approximately 100%, the thermal resistance to heat transfer generally increases.

Accordingly, each heat pipe and heat sink embodiment presented herein facilitates enhanced heat transfer from one or more heat sources through dynamically adjusting the heat transfer capabilities of the affected heat pipes automatically, thereby better dynamically modulating the heat transfer capabilities of the respective heat sink devices.

Referring to FIG. 1A, a schematic diagram of a heat pipe system 100 (herein referred to as "the system 100") is presented including a dynamically positionable hollow sleeve 130 in a first position, in accordance with some embodiments of the present disclosure. The system 100 includes an outer shell 102 and a wick structure 104 fixedly coupled to the outer shell 102. The wick structure 104 defines a substantially cylindrical chamber 106. The outer shell 102 and the wick structure 104 cooperate to define an evaporator section 108 and a corresponding evaporator portion 110 of the chamber 106. The evaporator portion 110 is distinguished from the evaporator section 108 in that the evaporator section 108 includes the evaporator portion 110, and the evaporator portion 110 is applied to the chamber 106 to distinguish the evaporator portion 110 of the chamber 106 from the other portions. Similarly, the outer shell 102 and the wick structure 104 cooperate to define a condenser section 112 and a corresponding condenser portion 114 of the chamber 106. The condenser portion 114 is distinguished from the condenser section 112 in that the condenser section 112 includes the condenser portion 114, and the condenser portion 114 is applied to the chamber 106 to distinguish the condenser portion 114 of the chamber 106 from the other portions, e.g., the evaporator portion 110. A plurality of cooling fins 116 are thermally coupled to the outer shell 102. A volatile liquid 118 is resident within the evaporator portion 110 of the chamber 106.

In operation, the heat pipe system 100 is positioned proximate to, including in some embodiments thermally coupled to, a heat source (not shown in FIG. 1A; however, see FIG. 4 for the heat source 490) that transmits heat 120 into the evaporator section 108, and into the volatile liquid 118 that is resident within the evaporator portion 110 of the chamber 106. The volatile liquid 118 is changed into a vapor stream 122 that is channeled through the chamber 106 into the condenser section 112, i.e., the condenser portion 114 of the chamber 106. The vapor stream 122 transmits the heat 120 to the plurality of cooling fins 116 that releases the heat 124 to the local environment (not labeled) as the condensing vapor stream 122 enters the wick structure 104 as condensate 126. The condensate 126 is transported back to the evaporator section 108 through capillary action to replenish the inventory of volatile liquid 118 in the evaporator portion 110 of the chamber 106.

In some embodiments, a vapor blocking device, i.e., the sleeve 130, is disposed within the chamber 106, where the sleeve 130 blocks, i.e., insulates, the vapor stream 122 from cooling fins 116. The sleeve 130 includes a cylindrical wall 132 that defines a circular inlet port 134 and a circular outlet port 136 with a cylindrical cavity 138 therebetween. As such, the cylindrical configuration of the sleeve 130 defines a vapor flow path therethrough via the inlet port 134, the cavity 138, and the outlet port 136. The sleeve 130 is configured to dynamically modify at least a portion of an effective active heat transfer region 125A of the condenser section 112, thereby dynamically modulate the transfer of the heat 124 through the condenser portion 114. As used herein, the term "effective active heat transfer region" refers to the portion, or sum of portions, of the cooling fins 116 that are actively employed to capture and transport heat 124 from the outer shell 102. This action is executed through using the wall 132 to insulate the selected portion of the active heat transfer region of the condenser section 112 including the respective portion of the wick structure 104, the respective portion of the outer shell 102, and the respective portion of the cooling fins 116, from the vapor stream 122 flowing within the condenser section 112.

Figure 1B:
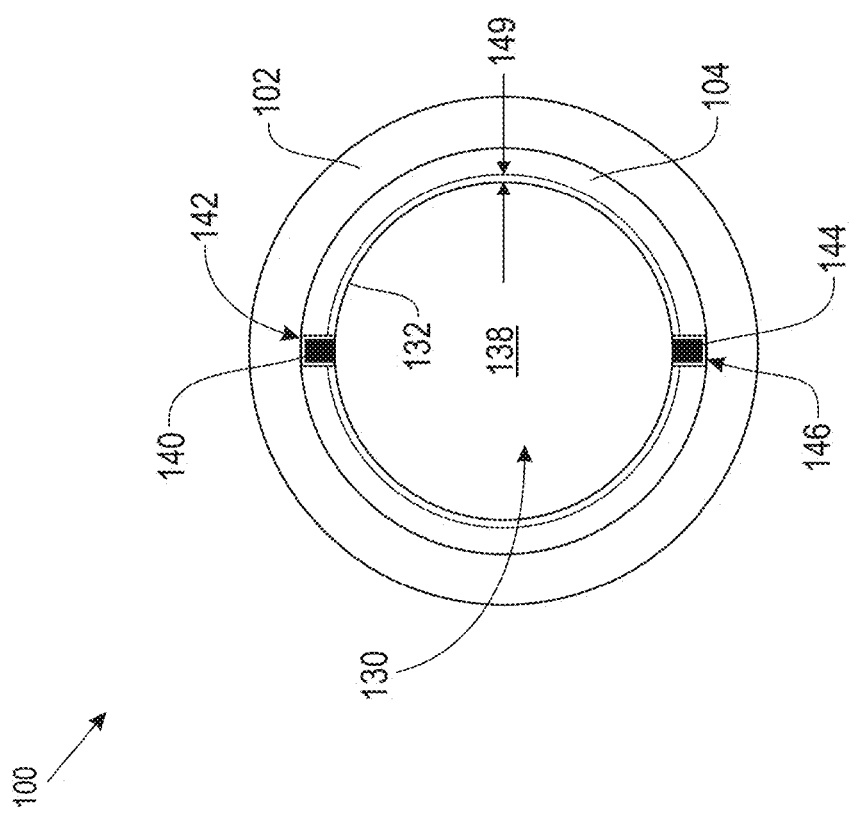
FIG. 1B is a schematic diagram of a cutaway view of a portion of the heat pipe system including the dynamically positionable hollow sleeve of FIG. 1A, in accordance with some embodiments of the present disclosure.

Referring to FIG. 1B, a schematic diagram of a cutaway view of a portion of the heat pipe system 100 including the dynamically positionable hollow sleeve 130 of FIG. 1A is presented, in accordance with some embodiments of the present disclosure. Also, referring to FIG. 1C, a schematic diagram of a magnified portion of the heat pipe system 100 including the dynamically positionable hollow sleeve 130 of FIGS. 1A and 1B is presented, in accordance with some embodiments of the present disclosure. Continuing to refer to FIG. 1A and continuing the numbering scheme thereof, the sleeve 130 is positioned in the chamber 106 (shown in FIG. 1A) with a first travel guide 140 (not shown in FIG. 1A) extending from the wall 132 of the sleeve 130 radially outward into a first guide track 142 (not shown in FIG. 1A) formed within the wick structure 104. Similarly, the sleeve 130 includes a second travel guide 144 (not shown in FIG. 1A) extending from the wall 132 of the sleeve 130 radially outward into a second guide track 146 (not shown in FIG. 1A) formed within the wick structure 104.

The number of two guide tracks 142 and 146 and two travel guides 140 and 144 is not a limiting value, and any number of guide tracks 142 and 146 and any number of the travel guides 140 and 144 that enable operation of sleeve 130 and the system 100 as described herein is used. For example, and without limitation, in some embodiments, the sleeve 130 includes two or more travel guides 140 and 144 for each respective guide track 142 and 146. In some embodiments, the system 100 includes three guide tracks separated at 120 degree intervals, and in some embodiments, the system includes four guide tracks separated at 90 degree intervals. In addition, the directly opposing configuration of the guide tracks 142 and 146 and the travel guides 140 and 144 is not limiting and any positioning of the guide tracks 142 and 146 and the travel guides 140 and 144 that enables operation of sleeve 130 and the system 100 as described herein is used. The length of the guide tracks 142 and 146 extend from an adiabatic region 148 of the chamber 106 (shown by a double-headed arrow in FIG. 1A) to approximately the far end of the condenser portion 114 of the chamber 106. The sizes of the travels guides 140 and 144 are configured to mitigate any potential for disengagement from, and any potential for excessive frictional interference with, travel thereof through the respective guide tracks 142 and 146.

In one or more embodiments, the outer shell 102 is fabricated from copper, or a copper alloy. In some embodiments, the outer shell 102 is fabricated from aluminum. In some embodiments, the outer shell 102 is fabricated from any materials that enable operation of the system 100 as described herein. In at least some embodiments, the wick structure 104 is fabricated from cintered copper to form a porous configuration to use the capillary action to transport the condensed vapor from the condenser section 112 to the evaporator section 108. In some embodiments, the sleeve 130 is fabricated from any materials that are susceptible to magnetic fields and that are chemically compatible with the volatile liquid 118 and its vapor stream 122 as well as the wick structure 104. For example, and without limitation, in some embodiments, ferromagnetic materials such as iron, iron alloys, copper, and cooper alloys are used.

In at least some embodiments, the wall 132 of the sleeve 130 and the inner surface of the wick structure 104 define a circumferential clearance 149 to facilitate movement of the sleeve 130 along the guide tracks 142 and 146, where the respective travel guides 140 and 144 facilitate radial support and stability of the sleeve 130. In addition, the guide tracks 142 and 146 and the respective travel guides 140 and 144 facilitate maintaining the sleeve 130 at the designed relative distance from the wick structure 104, i.e., the circumferential clearance 149 between the outside of the wall 132 of the sleeve 130 and the radially inner wall of the wick structure 104. Also, the guide tracks 142 and 146 and the respective travel guides 140 and 144 facilitate maintaining axial alignment of sleeve 130. Moreover, the guide tracks 142 and 146 and the respective travel guides 140 and 144 facilitate employment of a lock or positional brake (not shown) that engages when the magnetic coupling 162 is removed.

In addition, in some embodiments, the radially outer surface of the wall 132 is coated with a material to further facilitate free travel, e.g., and without limitation, TEFLON™. In some embodiments, the volatile liquid 118 includes additives that further facilitate lubrication of the radially outer surface of the wall 132. In addition, the manufacturing processes for the system 100 are executed to mitigate surface roughness of one or both of the inner surface of the wick structure 104 and the radially outer surface of the wall 132.

Figure 1C:
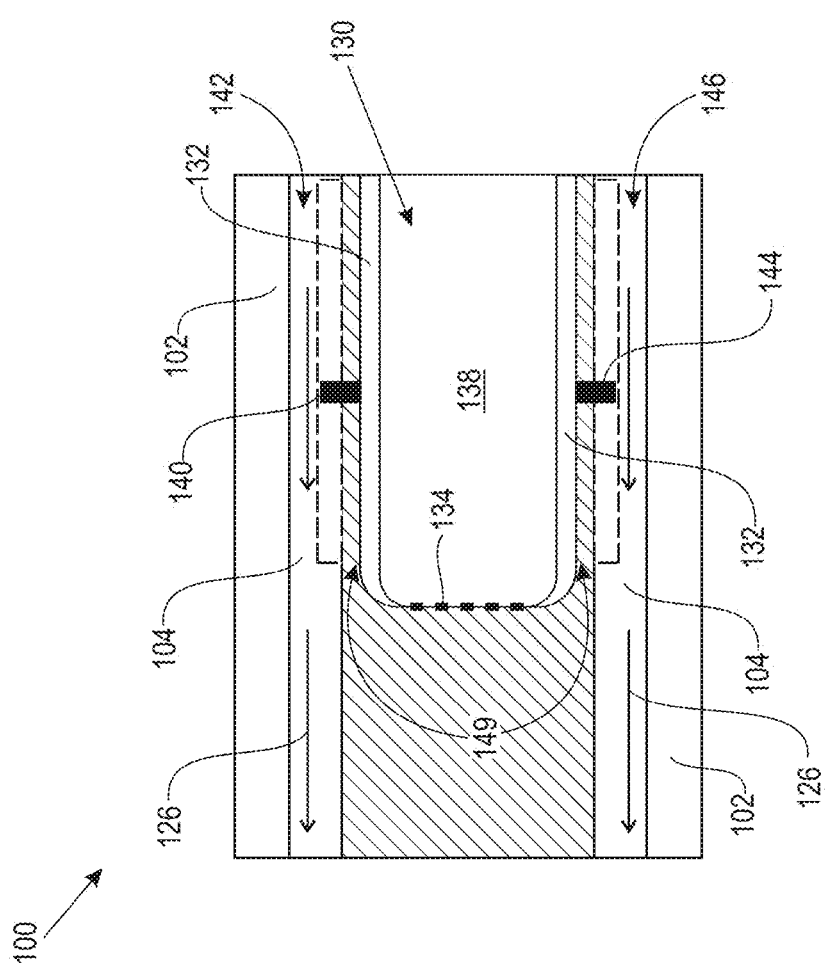
FIG. 1C is a schematic diagram of a magnified portion of the heat pipe system including the dynamically positionable hollow sleeve of FIGS. 1A and 1B, in accordance with some embodiments of the present disclosure.

In some embodiments, system 100 as shown in FIGS. 1A, 1B, and 1C (as well as at least some of the subsequent figures) is approximately 6 millimeters (mm) to approximately 8 mm in diameter and approximately 6 to 12 inches in length (FIGS. 1A, 1B, and 1C are not drawn to scale). The thickness of the outer shell 102 and the wick structure 104 are each approximately 0.3 mm to approximately 0.5 mm such that the chamber 106 is approximately 4 mm to approximately 6.8 mm in diameter. The sleeve 130 is approximately 0.5 mm smaller in diameter than the chamber 106, therefore the diameter of the sleeve 130 is approximately 3.5 mm to approximately 6.3 mm with the circumferential clearance 149 of approximately 0.25 mm. In addition, the circumferential clearance 149 between the outside of the wall 132 of the sleeve 130 and the radially inner wall of the wick structure 104 is not a perfect seal, where such small gaps will tend to choke or throttle the flow of the vapor stream 122, but not prevent it. Accordingly, the close tolerances facilitate transit of the sleeve 130 through the chamber 106, while mitigating flow of vapor stream 122 through the clearance 149 and not through the sleeve 130.

In one or more embodiments, the system 100 further includes a modulating device 150 that is external to the chamber 106 that includes a magnet 152, i.e., magnet 152 that is operably coupled to an actuator 154 through a coupling device 156. In some embodiments, the actuator 154 is configured to receive position commands 158 directed toward the sleeve 130 and transmit position feedback 160 as a portion of a larger control system (not shown). In some embodiments, an input to the position commands 158 includes, without limitation, a measured temperature of the heat-generating component proximate the system 100. The modulating device 150 is magnetically coupled to the sleeve 130 through a magnetic coupling 162, where the modulating device 150 is configured to dynamically reposition the sleeve 130 within the chamber 106 at least partially based on a temperature of the heat-generating component. Specifically, the modulating device 150 is configured to transport the magnet 152 longitudinally along a portion of the length of the chamber 106 such that the sleeve 130 is positionable anywhere between the adiabatic region 148 and the far end of the condenser portion 114. As shown in FIG. 1A, with the sleeve 130 in the adiabatic region 148, the effective active heat transfer region 125A of the condenser section 112 is the entirety of the cooling fins 116.

In some embodiments, the actuator 154 and the coupling device 156 are configured to move the magnet 152 orthogonally to the outer shell 102 to modulate the strength of the magnetic coupling 162. In some embodiments, the strength of the magnetic coupling 162 is modulated through the actuator 154 adjusting an electric current (not shown) through the coupling device 156 (i.e., an electric conduit within) to the magnetic 152. In some embodiments, more than one modulating device 150 is used. In some embodiments, rather than a magnet 152, a magnetic field generated through any mechanism that enable operation of the system 100 as described herein is used. For example, rather than a track for the actuator 154 to travel, a magnetic field device that extends longitudinally along the length of the chamber 106 from the adiabatic region 148 to the far end of the condenser portion 114 is energized sectionally to transport the sleeve 130.

In at least some embodiments, the cooling fins 116 have any length extending orthogonally to the outer shell 102, including substantially similar lengths and variable lengths, and are fabricated from any materials, that enable operation of the system 100 as described herein. In those embodiments that include the magnet 152, the cooling fins 116 define a longitudinal opening (not shown) to permit transit of the magnet 152 proximate the outer shell 102. In some embodiments, the magnet 152 is withdrawn toward the actuator 154 to travel over the cooling fins 116 where the strength of the magnetic coupling 162 is modulated to facilitate the travel of the sleeve 130.

Figure 1D:
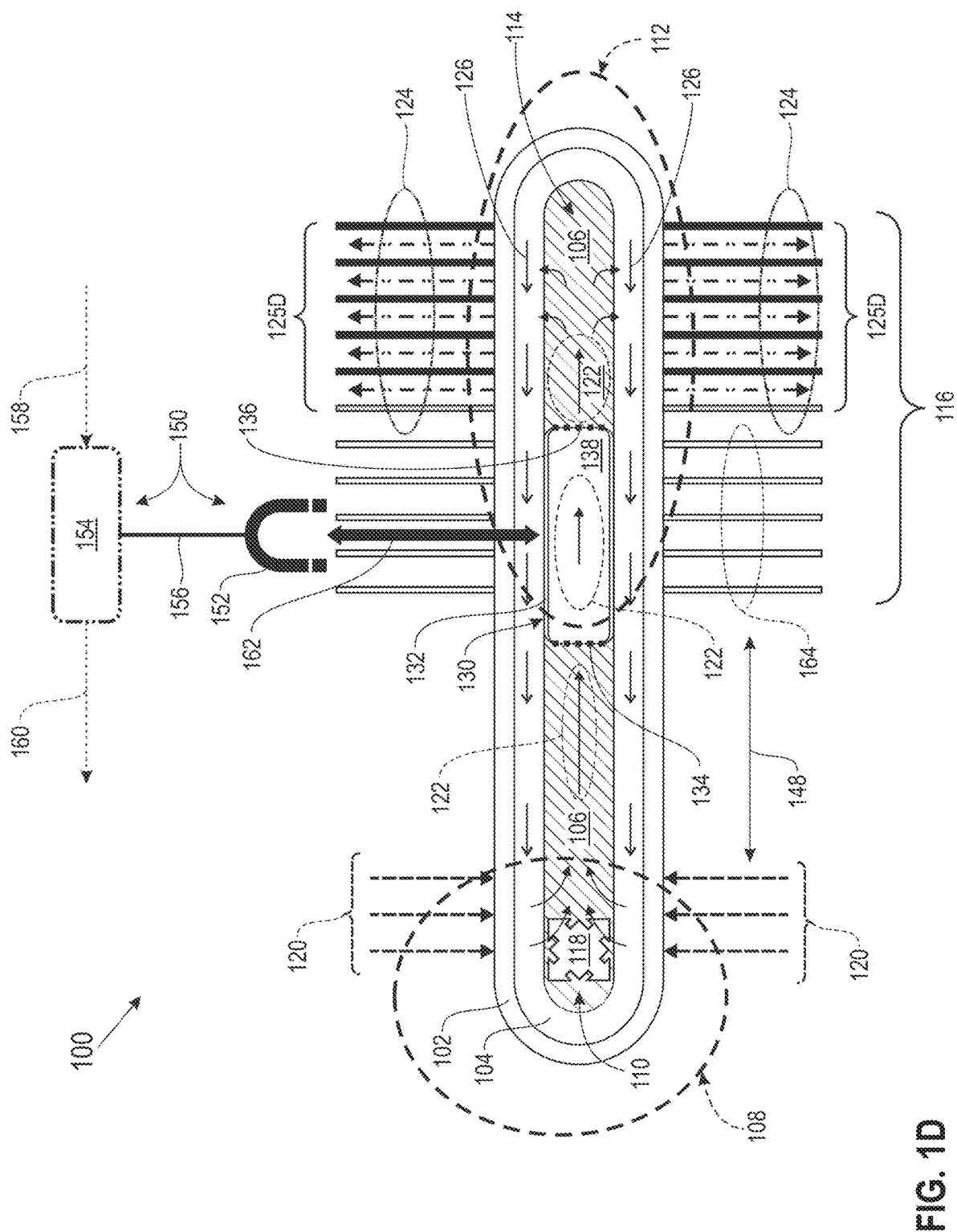
FIG. 1D is a schematic diagram of the heat pipe system including the dynamically positionable hollow sleeve of FIGS. 1A-1C in a second position, in accordance with some embodiments of the present disclosure.

Referring to FIG. 1D, a schematic diagram of the heat pipe system 100 including the dynamically positionable hollow sleeve 130 of FIGS. 1A-1C in a second position is presented, in accordance with some embodiments of the present disclosure. Continuing to refer to FIGS. 1A-1C and continuing the numbering scheme thereof, the sleeve 130 is shown in the second position as transported by the modulating device 150 through the embodiment thereof that includes the magnet 152 retracted orthogonally from the outer shell 102 to modulate the strength of the magnetic coupling 162. The sleeve 130 has dynamically modified at least a portion of the previous effective active heat transfer region 125A (see FIG. 1A) of the condenser section 112 to an effective active heat transfer region 125D that includes only a portion of the cooling fins 116. The remaining cooling fins 116 define an insulated section 164 of cooling fins 116. As such, the system 100 has dynamically modulated the transfer of the heat 124 through the condenser section 112.

Figure 1E:
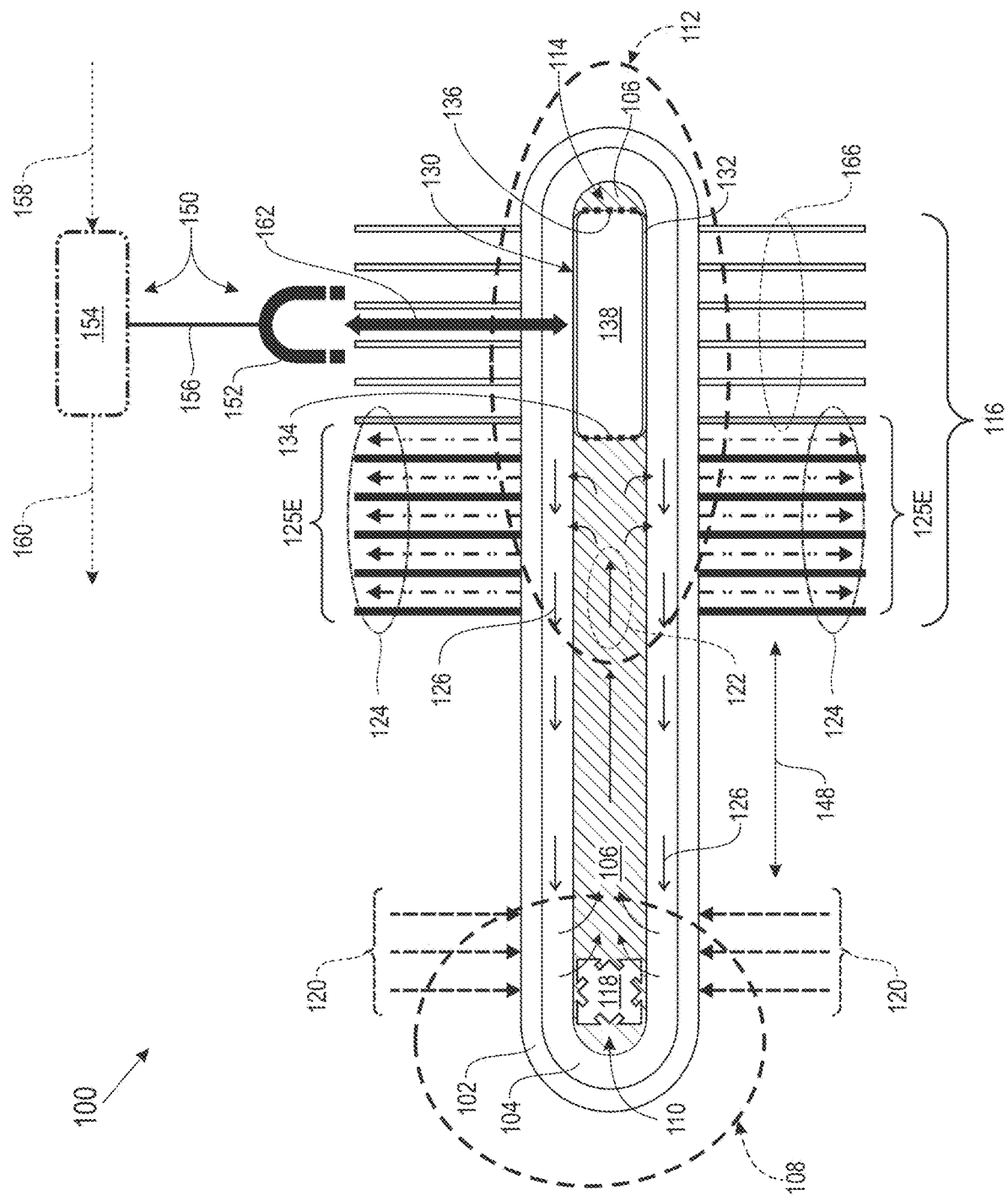
FIG. 1E is a schematic diagram of the heat pipe system including the dynamically positionable hollow sleeve of FIG. 1A-1D in a third position, in accordance with some embodiments of the present disclosure.

Similarly, referring to FIG. 1E, a schematic diagram of the heat pipe system 100 including the dynamically positionable hollow sleeve 130 of FIGS. 1A-1D in a third position is presented, in accordance with some embodiments of the present disclosure. Continuing to refer to FIGS. 1A-1D and continuing the numbering scheme thereof, the sleeve 130 is shown in the third position as transported by the modulating device 150 through the embodiment thereof that includes the magnet 152 retracted orthogonally from the outer shell 102 to modulate the strength of the magnetic coupling 162. The sleeve 130 has dynamically modified at least a portion of the previous effective active heat transfer region 125A (see FIG. 1A) and 125D (see FIG. 1D) of the condenser section 112 to an effective active heat transfer region 125E that includes only a portion of the cooling fins 116. The remaining cooling fins 116 define an insulated section 166 of cooling fins 116. As such, the system 100 has dynamically modulated the transfer of the heat 124 through the condenser portion 114.

Therefore, the sleeve 130 is repositioned within the heat pipe chamber 106 to cover sections of the wick structure 104 to impede condensing of the vapor stream 122 proximate the sleeve 130 and the subsequent heat 124 transferred to the cooling fins 116 due to the insulating by the sleeve 130. The sleeve 130 open at each end facilitates travel of the vapor stream 122 through the sleeve 130 to other sections of the heat pipe chamber 106. The sleeve 130 does not block the migration of the condensate 126 in the wick structure 104 returning to the evaporator section 108. In addition, the effective internal volume of the chamber 106 and the wick structure 104 does not change with the repositioning of the sleeve 130, therefore the saturation pressure for the closed system remains substantially unchanged. Furthermore, the amount of volatile liquid 118 in the chamber 106 and the wick structure 104 does not need to be adjusted for optimal heat transfer as the excess condensate 126 fluid will be stored in the wick structure 104 which does not change.

In some embodiments, for example, those embodiments of system 100 with extended longitudinal lengths, as well as an extended condenser section 112 with a commensurate extended number of cooling fins 116, more than one sleeve 130 is used to create multiple effective active heat transfer regions 125D and 125E.

Figure 2A:
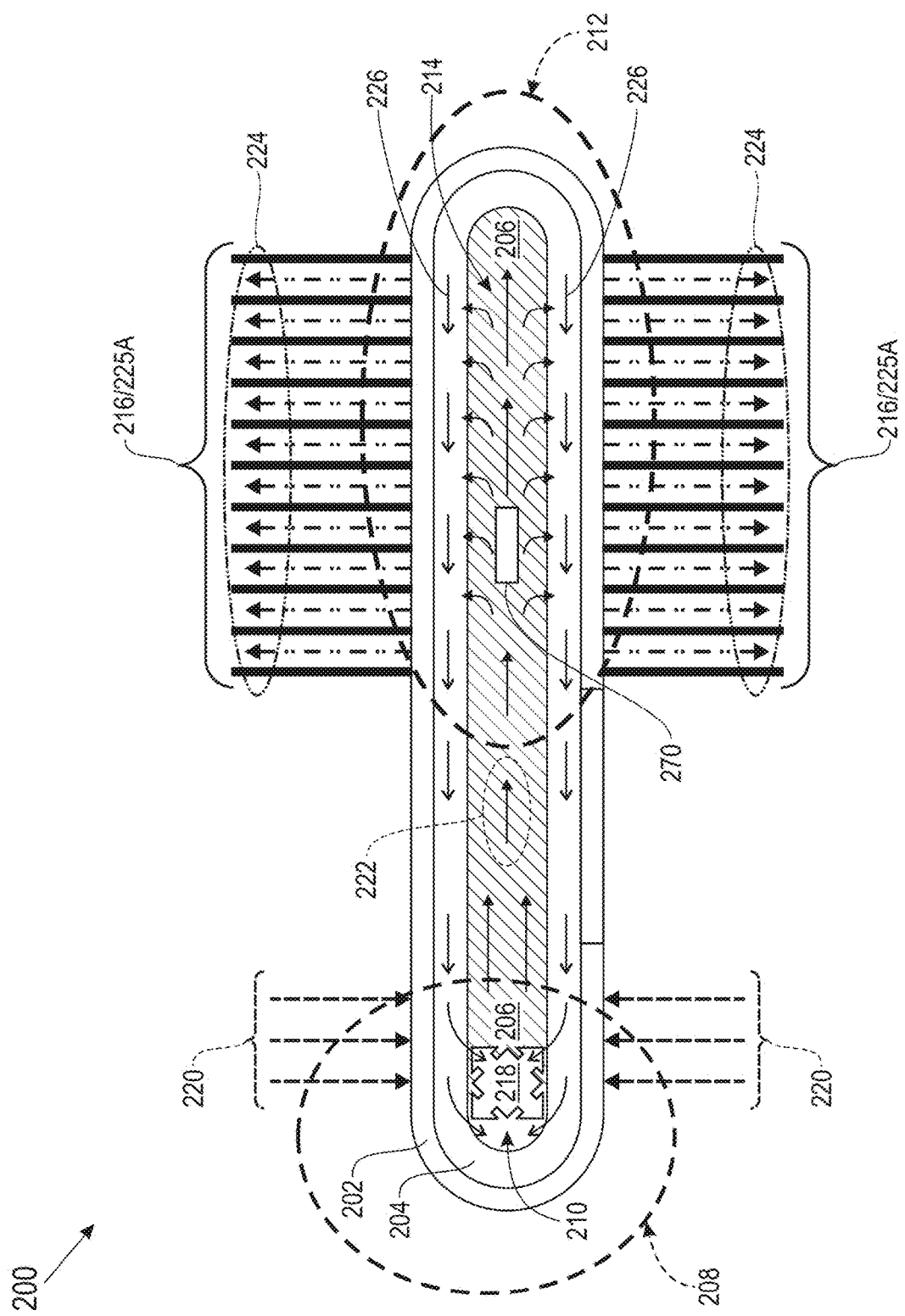
FIG. 2A is a schematic diagram of a heat pipe system including a dynamically positionable valve in a first position, in accordance with some embodiments of the present disclosure.
Figure 2B:
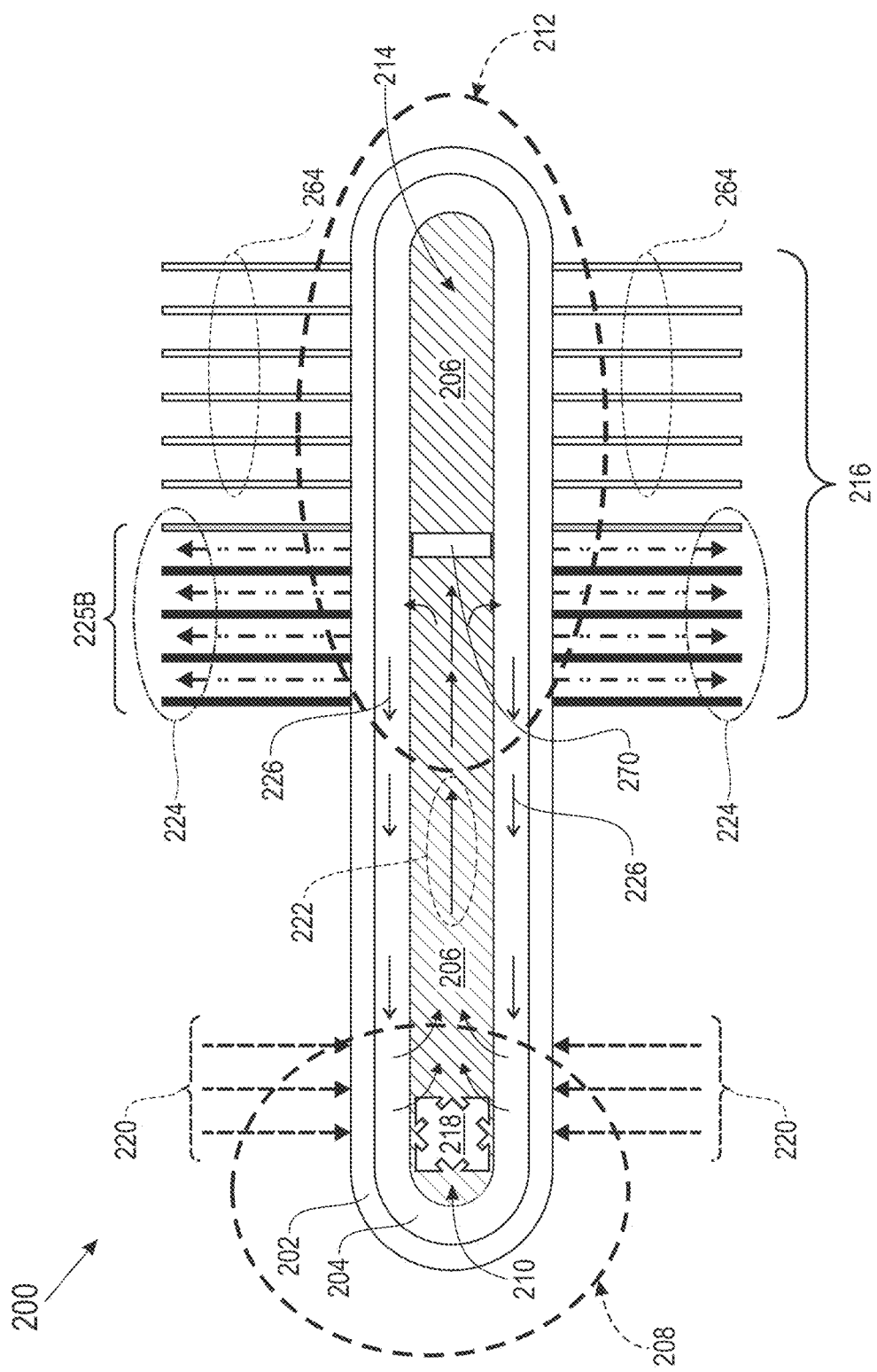
FIG. 2B is a schematic diagram of the heat pipe system including the positionable valve of FIG. 2A in a second position, in accordance with some embodiments of the present disclosure.
Figure 2C:
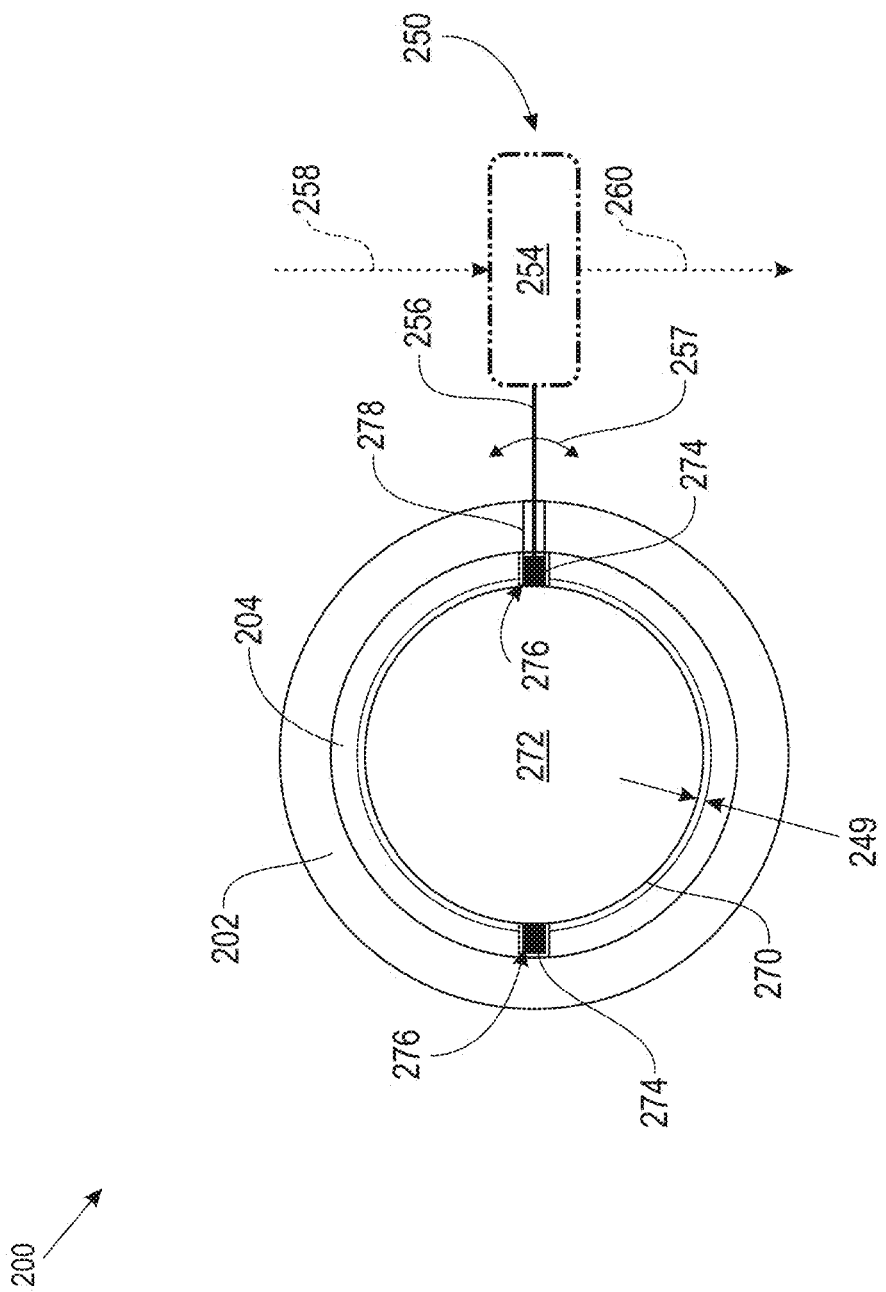
FIG. 2C is a schematic diagram of a cutaway view of a portion of the heat pipe system including the positionable valve of FIGS. 2A-2B, in accordance with some embodiments of the present disclosure.

Referring to FIG. 2A, a schematic diagram of a heat pipe system 200 (herein referred to as "the system 200") including a dynamically positionable valve 270 in a first position is presented, in accordance with some embodiments of the present disclosure. Also referring to FIG. 2B, a schematic diagram of the system 200 including the positionable valve 270 of FIG. 2A in a second position is presented, in accordance with some embodiments of the present disclosure. Further referring to FIG. 2C, a schematic diagram of a cutaway view of a portion of the system 200 including the positionable valve 270 of FIGS. 2A-2B is presented, in accordance with some embodiments of the present disclosure. In FIG. 2C, the valve 270 is shown in the position indicated in FIG. 2B. The system 200 is similar to the system 100 as described in FIGS. 1A-1E with at least one exception, i.e., rather than a modulating device 150 including a sleeve 130, the system 200 includes a modulating device 250 that includes the positionable valve 270, where the valve 270 is a vapor blocking device. The valve 270 is configured to at least partially isolate at least a portion of the condenser portion 214 from at least a portion of the vapor stream 222 flowing through the condenser portion 214.

In at least some embodiments, the valve 270 is a butterfly valve that is resident within the chamber 206. In some embodiments, any valve type that enables operation of the system 200 as described herein is used. In FIG. 2A, the valve 270 is shown in an open position, and in FIGS. 2B and 2C, the valve 270 is shown in the closed position.

Referring only to FIG. 2C, the valve 270 includes a rotatable disk 272 and two cylindrical pins 274, where the pins 274 are resident within their respective pin cavities 276. One of the pins 274 is rotatably coupled to an actuator 254 through a coupling member 256 as indicated by arrow 257. In some embodiments, the actuator 254 is configured to receive position commands 258 directed toward the valve 270 and transmit position feedback 260 as a portion of a larger control system (not shown). In some embodiments, an input to the position commands 258 includes, without limitation, a measured temperature of the heat-generating component proximate the system 200. Some embodiments include an outer shell sealing device 278 at least partially embedded within the outer shell 202 to mitigate a potential for liquid or vapor leakage from the chamber 206. In at least some embodiments, the disk 272 of the valve 270 and the inner surface of the wick structure 204 define a circumferential clearance 249 to facilitate movement of the disk 272, where the respective pins 274 facilitate radial support and stability of the disk 272. In addition, in some embodiments, the radially outer surface of the disk 272 is coated with a material to further facilitate free travel, e.g., and without limitation, TEFLON™. In some embodiments, the volatile liquid 218 includes additives that further facilitate lubrication of the radially outer surface of the disk 272. In addition, the manufacturing processes for the system 200 are executed to mitigate surface roughness of one or both of the inner surface of the wick structure 204 and the radially outer surface of the disk 272. In some embodiments, there is a design leakage of vapor stream 222 through the clearance 249.

Referring again to FIGS. 2A and 2B, in at least some embodiments, the valve 270 is a binary device, i.e., the state of the valve 270 is either one of fully open (as shown in FIG. 2A) or fully closed (as shown in FIG. 2B). In such embodiments, valve is configured to dynamically modify at least a portion of an effective active heat transfer region 225A of the condenser section 212, thereby dynamically modulate the transfer of the heat 224 through the condenser portion 214. As shown in FIG. 2A, with the valve 270 fully open, the effective active heat transfer region 225A of the condenser section 212 is the entirety of the cooling fins 216. As shown in FIG. 2B. with the valve 270 fully closed, the valve 270 has been dynamically modified such that at least a portion of the previous effective active heat transfer region 225A (see FIG. 2A) of the condenser section 212 is decreased to an effective active heat transfer region 225B that includes only a portion of the cooling fins 216. The remaining cooling fins 216 define an isolated section 264 of cooling fins 216. As such, the system 200 has dynamically modulated the transfer of the heat 224 through the condenser portion 214.

In some embodiments, the valve 270 is modulated through the full range of the associated 90 degree motion rather than the binary open and closed states of the valve 270. Such embodiments provide more granularity to the vapor stream 222 to maintain at least some heat transfer of the heat 224 through the section 264 of the cooling fins 216.

In some embodiments, for example, those embodiments of system 200 with extended longitudinal lengths, as well as an extended condenser section 212 with a commensurate extended number of cooling fins 216, and since the valve 270 is in a fixed location, more than one valve 270 is used to create a series of active heat transfer regions 225B.

Figure 3A:
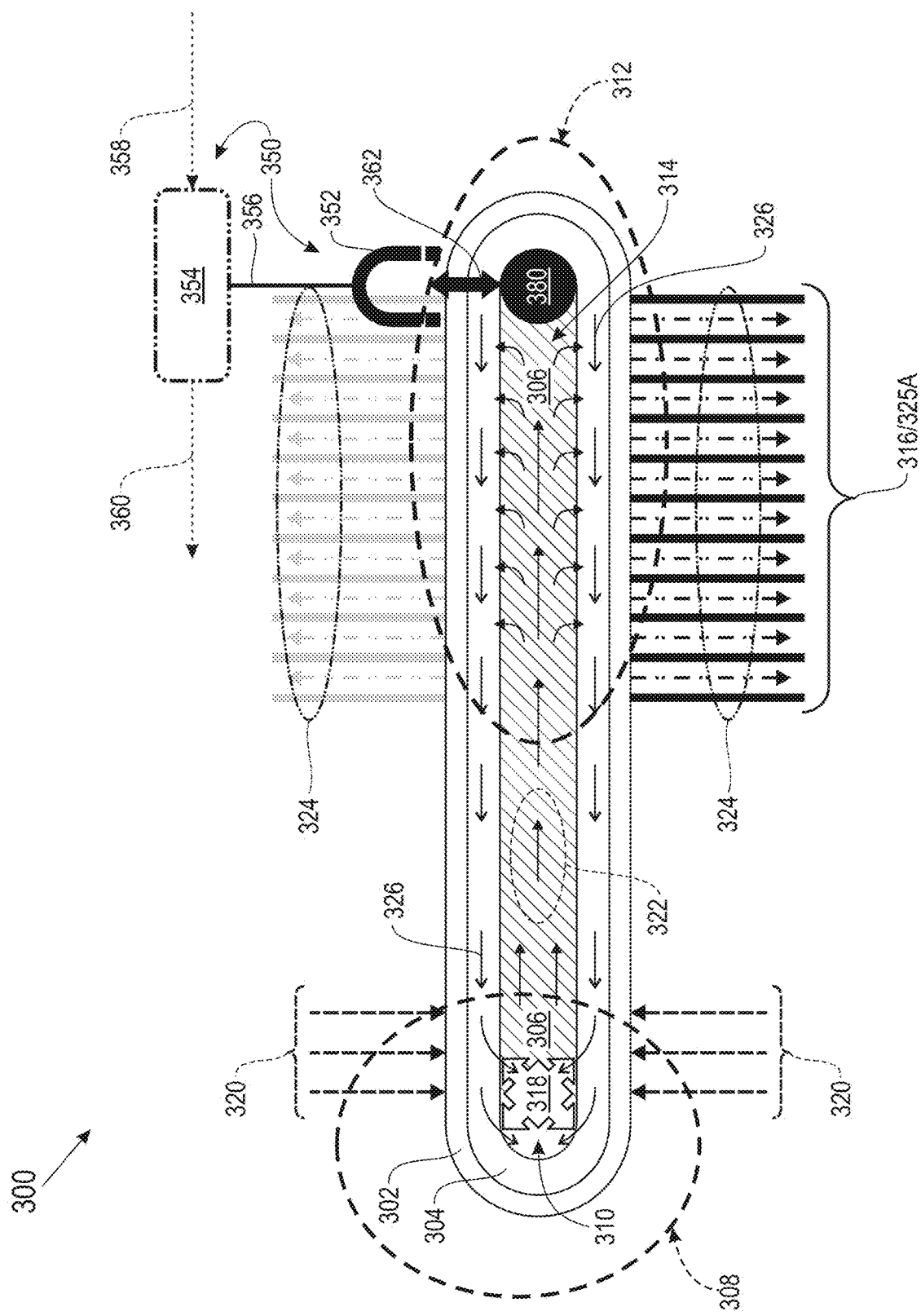
FIG. 3A is a schematic diagram of a heat pipe system including a dynamically positionable blocking object in a first position, in accordance with some embodiments of the present disclosure.

Referring to FIG. 3A, a schematic diagram of a heat pipe system 300 (herein referred to as "the system 300") including a dynamically positionable blocking object 380 in a first position is presented, in accordance with some embodiments of the present disclosure. Also referring to FIG. 3B, a schematic diagram of the system 300 including the positionable blocking object 380 of FIG. 3A in a second position is presented, in accordance with some embodiments of the present disclosure. The system 200 is similar to the system 100 as described in FIGS. 1A-1E and the system 200 as described in FIGS. 2A-2C with at least one exception, i.e., rather than a modulating device 150 including the sleeve 130, or a modulating device 250 that includes the positionable valve 270, the system 300 includes a modulating device, i.e., the positionable blocking object 380, where the blocking object 380 is a vapor blocking device. The blocking object 380 is configured to at least partially block, i.e., isolate at least a portion of the condenser portion 314 from at least a portion of the vapor stream 322 flowing through the condenser portion 314. In FIG. 3A, the blocking object 380 is shown in an idle position at the far end of the condenser portion 314 of the chamber 306, and in FIG. 3B, the blocking object 380 is shown in an active position.

In at least some embodiments, the blocking object 380 is a spherical object that is resident within the chamber 306, where the diameter of the blocking object 380 is slightly smaller than the diameter of the chamber 306. For example, in some embodiments, with the magnetic coupling 362 adjusted to a magnetic field strength that substantially centers the blocking object 380 in the center of the condenser portion 314 of the chamber 306, a circumferential clearance (not shown) of approximately 0.25 mm to approximately 0.5 mm is established between the outer surface of the blocking object 380 and the radially inner wall of the wick structure 304. In some of these embodiments, there is a design leakage of vapor stream 322 through the clearance. Therefore, in such embodiments, a perfect seal is not established, where such small gaps will tend to choke or throttle the flow of the vapor stream 322, but not prevent it. Accordingly, the close tolerances facilitate transit of the blocking object 380 through the chamber 306, while mitigating flow of vapor stream 322 through the clearance.

In addition, in some embodiments, the radially outer surface of the blocking object 380 is coated with a material to further facilitate free travel, e.g., and without limitation, TEFLON™. In some embodiments, the volatile liquid 318 includes additives that further facilitate lubrication of the radially outer surface of the blocking object 380. In addition, the manufacturing processes for the system 300 are executed to mitigate surface roughness of one or both of the inner surface of the wick structure 304 and the radially outer surface of the blocking object 380.

In some embodiments, any shape of object that enables operation of the system 300 as described herein is used, including, for example, a cylindrical object similar to the sleeve 130 (see FIGS. 1A-1E), however, in such embodiments, the object is solid with no cylindrical cavity 138.

In one or more embodiments, the system 300 further includes a modulating device 350 that is similar to the modulating device 150 (shown in FIG. 1A). Specifically, the modulating device 350 is substantially external to the chamber 306 that includes a magnet 352, i.e., magnet 352 that is operably coupled to an actuator 354 through a coupling device 356. In some embodiments, the actuator 354 is configured to receive position commands 358 directed toward the blocking object 380 and transmit position feedback 360 as a portion of a larger control system (not shown). In some embodiments, an input to the position commands 358 includes, without limitation, a measured temperature of the heat-generating component proximate the system 300. The modulating device 350 is magnetically coupled to the blocking object 380 through the magnetic coupling 362, where the modulating device 350 is configured to dynamically reposition the blocking object 380 within the chamber 306 at least partially based on a temperature of the heat-generating component. Specifically, the modulating device 350 is configured to transport the magnet 352 longitudinally along a portion of the length of the chamber 306 such that the blocking object 380 is positionable anywhere within the condenser portion 314, including the far end of the condenser portion 314. As shown in FIG. 3A, with the blocking object 380 in the idle position at the far end of the condenser section 312, the effective active heat transfer region 325A of the condenser section 312 is the entirety of the cooling fins 316.

In some embodiments, the actuator 354 and the coupling device 356 are configured to move the magnet 352 orthogonally to the outer shell 302 to modulate the strength of the magnetic coupling 362 (as previously described further with respect to FIGS. 1A-1E). In such embodiments, the magnet 352 is withdrawn toward the actuator 354 to travel over the cooling fins 316 where the strength of the magnetic coupling 362 is modulated to facilitate the travel of the blocking object 380. In some embodiments, the strength of the magnetic coupling 362 is modulated through the actuator 354 adjusting an electric current (not shown) through the coupling device 356 (i.e., an electric conduit within) to the magnet 352. In some embodiments, a portion of the cooling fins 316 (shown in phantom in FIGS. 3A and 3B) define a longitudinal opening (not shown) to permit transit of the magnet 352 proximate the outer shell 302.

In some embodiments, more than one modulating device 350 is used. In some embodiments, rather than a magnet 352, a magnetic field generated through any mechanism that enable operation of the system 300 as described herein is used. For example, rather than a track for the actuator 354 to travel, a magnetic field device that extends longitudinally along a portion of the length of the chamber 306 such that the blocking object 380 is positionable anywhere within the condenser portion 314, including the far end of the condenser portion 314, is used.

Figure 3B:
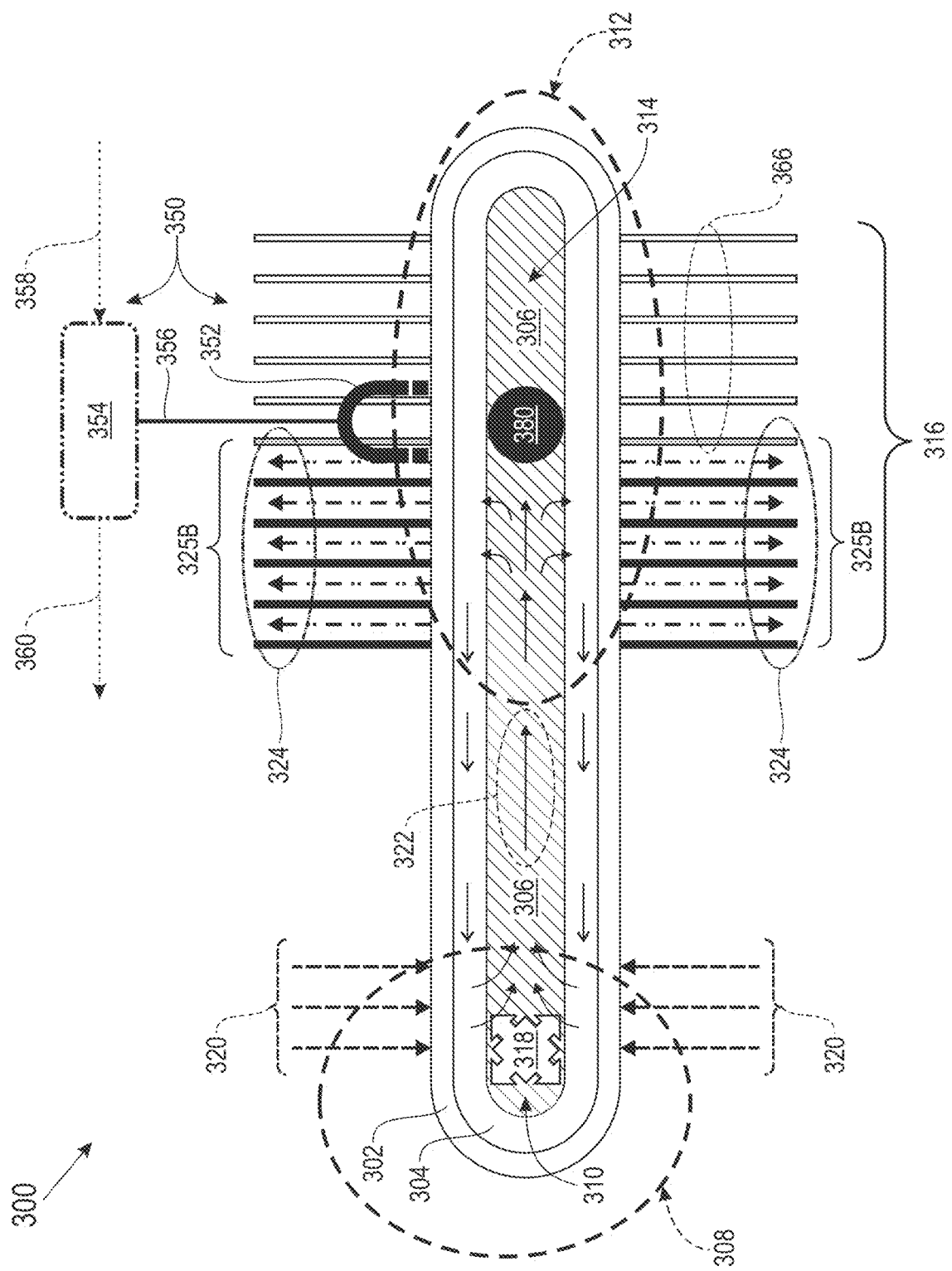
FIG. 3B is a schematic diagram of the heat pipe system including the dynamically positionable blocking object of FIG. 3A in a second position, in accordance with some embodiments of the present disclosure.

In at least some embodiments, the blocking object 380 is configured to dynamically modify at least a portion of the effective active heat transfer region 325A (see FIG. 3A) of the condenser section 312, thereby dynamically modulate the transfer of the heat 324 through the condenser portion 314. As shown in FIG. 3A, and as previously described, with the blocking object 380 in the idle position, the effective active heat transfer region 325A of the condenser section 312 is the entirety of the cooling fins 316. As shown in FIG. 3B, with the blocking object 380 in a blocking position, the flow of vapor stream 322 has been dynamically modified such that at least a portion of the previous effective active heat transfer region 325A of the condenser section 312 is decreased to an effective active heat transfer region 325B that includes only a portion of the cooling fins 316. The remaining cooling fins 316 define an isolated section 364 of cooling fins 316. As such, the system 300 has dynamically modulated the transfer of the heat 324 through the condenser portion 314.

Figure 4:
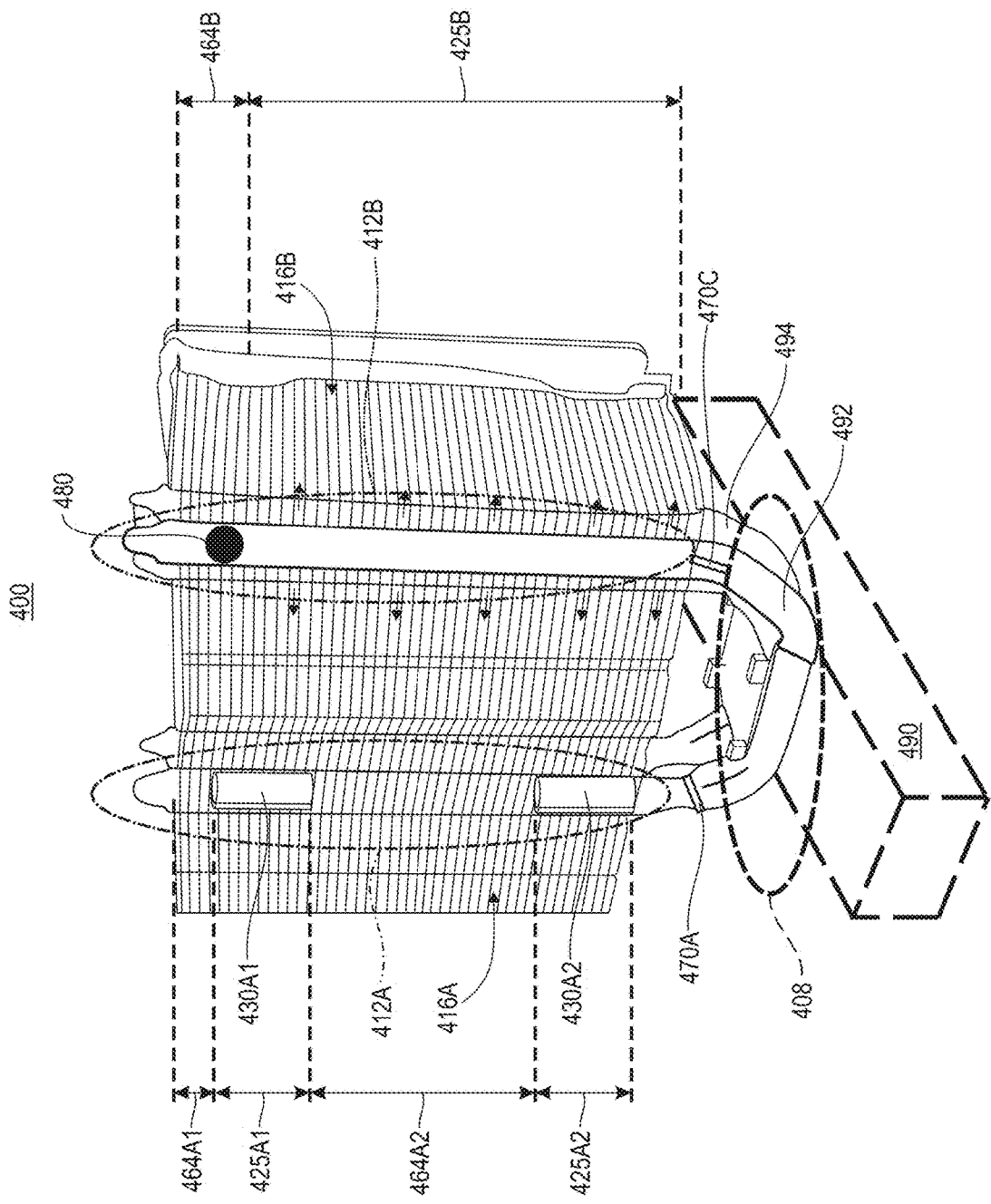
FIG. 4 is a schematic diagram of a heat sink system including a plurality of U-shaped heat pipes coupled to a heat source, in accordance with some embodiments of the present disclosure.

Referring to FIG. 4, a schematic diagram of a heat sink system 400 including a plurality of U-shaped heat pipes, i.e., a first heat pipe 492 and a second heat pipe 494 coupled to a heat source 490, in accordance with some embodiments of the present disclosure. In general, the numbering scheme of FIGS. 1A-3B are followed with the exceptions and additions clearly evident. In some embodiments, the heat source 490 is a multi-core processing device. In some embodiments, the heat source 490 is any heat-generating component that can be effectively cooled through the heat pipe embodiments described herein. The description of FIG. 4 is primarily directed toward the first heat pipe 492, where the second heat pipe 494 is substantially similar. The first heat pipe 492 includes a horizontally-oriented evaporator section 408 that is thermally coupled to the heat-generating component, i.e., the heat source 490. The first heat pipe 492 also includes two or more vertically-oriented condenser sections, i.e., a first condenser section 412A and a second condenser section 412B that are each coupled in fluid communication with the evaporator section 408. The heat sink system 400 also includes a plurality of cooling fins, i.e., a first set of cooling fins 416A thermally coupled to the first condenser section 412A and a second set of cooling fins 416B thermally coupled to the second condenser section 412B.

In at least some embodiments, each condenser section 412A and 412B includes one or more vapor blocking devices. As presented for illustrative purposes, the first condenser section includes a plurality of sleeves 430A1 and 430A2, where each of the sleeves 430A1 and 430A2 are substantially similar to the sleeve 130 (shown in FIGS. 1A-1E). The modulating devices for the sleeves 430A1 and 430A2 that are substantially similar to the modulating devices described for the sleeve 130, including the modulating device 150, are not shown in FIG. 4. Also, between each of the condenser sections 412A and 412B and the evaporator section 408 a first valve 470A and a second valve 470B, respectively, is positioned. The valves 470A and 470B are substantially similar to the valve 270 (shown in FIGS. 2A-2C), where the associated modulating devices, including the modulating device 250, are not shown in FIG. 4. The first valve 470A is shown in the closed position, thereby effectively isolating the first condenser section 412A from the evaporator section 408. As such, all of the cooling fins 416A are isolated and there is no effective active heat transfer region of the condenser section 412A.

In one or more embodiments, in contrast to the first condenser section 412A, the second valve 470B is shown in the open position. In addition, the second condenser section 412B includes a blocking object 480 that is substantially similar to the blocking object 380 (shown in FIGS. 3A-3B), where the modulating devices for the blocking object 480 that is substantially similar to the modulating devices described for the blocking object 380, including the modulating device 350, are not shown in FIG. 4. The position of the blocking object 480 defines an isolated section 464B of the cooling fins 416B and an effective active heat transfer region 425B. Similarly, in some embodiments, the valve 470A is open, and the positions of the sleeves 430A1 and 430A2 define two isolated sections 464A1 and 464A2 of the cooling fins 416A and two effective active heat transfer regions 425A1 and 425A2.

Figure 5:
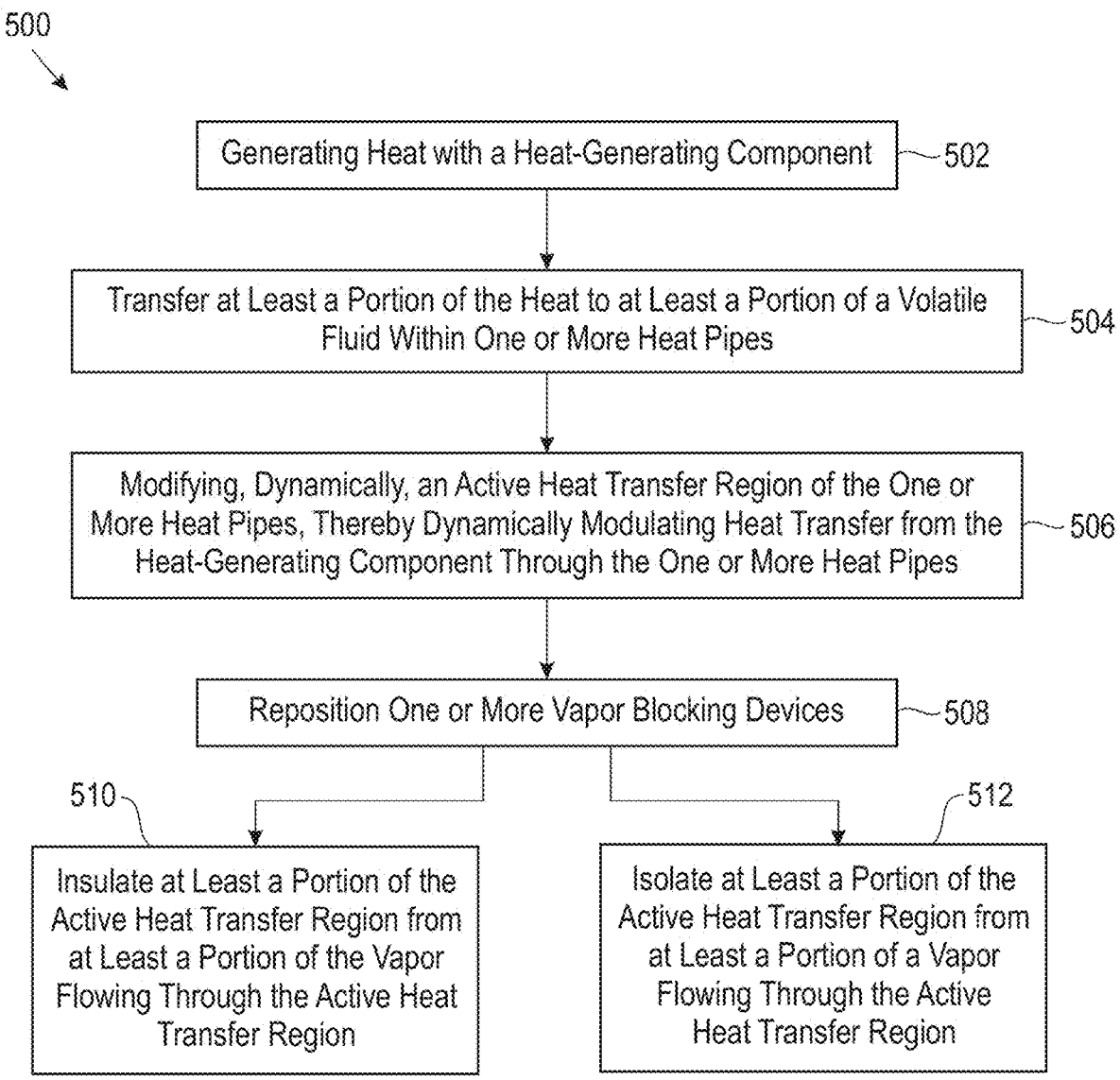
FIG. 5 is a flowchart illustrating a process for enhancing heat transfer from heat-generating components through heat pipes, in accordance with some embodiments of the present disclosure.

Referring to FIG. 5, a flowchart is provided illustrating a process 500 for enhancing heat transfer from heat-generating components through heat pipes, in accordance with some embodiments of the present disclosure. Also referring to FIGS. 1A-4, the process 500 includes generating 502 heat with the heat-generating component, e.g., and without limitation, the heat source 490. The process 500 also includes transferring 504 at least a portion of the heat to at least a portion of a volatile fluid within one or more heat pipes. For example, and without limitation, heat energy 120, 220, and 320 is transferred into the respective evaporator sections 108, 208, 308, as well as the evaporator section 408, of the respective heat pipe systems 100, 200, and 300, as well as the heat sink system 400. The process 500 further includes modifying 506, dynamically, an active heat transfer region (see the effective active heat transfer regions 125A, 125B, 125C, 225A, 225B, 325A, 325B, 425A1, 425A2, and 425B) of the one or more heat pipes, thereby dynamically modulating heat transfer from the heat source 490 through the one or more heat pipes.

In one or more embodiments, the process 500 also includes repositioning 508, dynamically, within the one or more heat pipes, through one or more respective modulating devices (see the modulating devices 150, 250, and 350 in their respective figures), one or more vapor blocking devices (see the sleeve 130, the valve 270, and the blocking device 380 in their respective figures). Accordingly, the repositioning 508 of the respective modulating devices 150, 250, and 350 facilitate the modulation of the heat transfer through the respective heat pipe by positioning the respective vapor blocking devices to either insulate or isolate the respective cooing fins as described further.

In some embodiments, the repositioning 508 operation of the one or more vapor blocking devices includes insulating 510, dynamically, at least a portion of the active heat transfer region of the one or more heat pipes, from at least a portion of a vapor flowing through the active heat transfer region. The sleeves 130, 430A1, and 430A2 are repositioned to extend over at least a portion of the cooling fins 116, 416A, and 416B to define the insulated sections 164 of cooling fins 116, and the two isolated sections 464A1 and 464A2 of the cooling fins 416A. For the system 100, the streams of vapor stream 122 are insulated from the wick structure 104, the outer shell 102, and the respective cooling fins 116 by the sleeve 130. In turn, for both the system 100 and the heat sink system 400, respective effective active heat transfer regions 125A, 125B, 125C, 425A1, and 425A2 result as a consequence. Examples include the effective active heat transfer regions 125B and 125C are different from the initial effective heat transfer region 125A responsive to the repositioning 508 of the sleeve 130 and the subsequent insulating 510. Accordingly, the insulating 510 of the respective cooling fins from the vapor within the heat pipe chamber effectively changes the heat transfer through the heat pipe by effectively removing at least a portion of the cooing fins from the heat transfer process.

In some embodiments, the repositioning 508 operation of the one or more vapor blocking devices includes isolating 512, dynamically, at least a portion of the active heat transfer region of the one or more heat pipes, from at least a portion of a vapor flowing through the active heat transfer region. The valves 270 (as well as the valves 470A and 470B), and the blocking objects 380 (and 480), are repositioned 508 as described elsewhere herein. Such repositioning 508 to define those portions of the respective chambers 206 and 306 that are isolated from the respective streams of vapor streams 222 and 322, i.e., the isolated section 264 of the cooling fins 216 and the isolated section 364 of the cooling fins 316. Such isolation 512 defines the effective active heat transfer regions 225A and 225B of the condenser section 212, and the effective active heat transfer regions 325A and 325B of the condenser section 312. One example includes the effective active heat transfer region 225B is different from the initial effective heat transfer region 225A responsive to the repositioning 508 of the valve 270 and the subsequent isolating 512. A second example includes the effective active heat transfer region 325B is different from the initial effective heat transfer region 325A responsive to the repositioning 508 of the blocking object 380 and the subsequent isolating 512. Accordingly, the isolating 512 of the respective cooling fins from the vapor within the heat pipe chamber effectively changes the heat transfer through the heat pipe by effectively removing at least a portion of the cooing fins from the heat transfer process.

A feature of the systems and methods described herein includes changing, dynamically, a fill ratio within the respective heat pipes as a result of modifying 506, dynamically, the active heat transfer region of the respective heat pipes. Specifically, the repositioning of devices in the chamber changes the total volume of the heat pipe chamber that impacts the effective fill ratio (sometimes referred to as filling ratio) for a fixed mass of the volatile fluid (liquid and vapor states combined) resident in the heat pipe. Since the fill ratio is defined as the volume of liquid (thereby excluding the vapor) presently in the heat pipe as compared to the volume of the evaporator section, the fill ratio increases from an initial value to a different, i.e., greater value as the vapor generation decreases as a result of a decreasing temperature of the heat source, and the sum of the liquid in the wick structure and the evaporator section increase. As the fill ratio increases from for example, and without limitation, from dry (approximately 0%, i.e., substantially all of the liquid has been vaporized in the evaporator section) to approximately 85%, the thermal resistance to heat transfer decreases, thereby facilitating high heat transfer rates at lower differential temperatures between the object being cooled and the localized environment. As the fill ratio increases from approximately 85% to approximately 100%, the thermal resistance to heat transfer increases.

The systems and methods described herein result in a more efficient and effective dynamic modulating of the heat transfer capabilities of the respective heat sink devices. Specifically, systems and methods presented herein provide for an improved, dynamic heat pipe that can adjust its active regions to direct the heat transfer to the most appropriate section of cooling fins. This facilitates the heat sink dynamically responding to workload shifts across cores in a modern multi-core processor. As such, the systems and methods described herein facilitate broadening the design operational spectrum for effective and efficient heat removal to more closely approach the design operational spectrum of the respective heat-generating component. Accordingly, the systems and methods described herein enhance the capabilities of the respective heat pipes to dynamically adjust the physical locations of the highest performing regions of the heat sink in response to varying heat source location as the processing loads of the various cores are changing.

Further, dynamically adjusting the locations of the highest performing regions of the heat sink, in some instances, where multiple heat pipes are used in a single heat sink, the result of manipulating the heat dissipated in specific regions of the heat pipe facilitates more effective cooling of specific components. Such manipulating of a path of the vapor stream within a heat pipe adjusts the heat flux in a manner that enhances heat removal from components in an electronics enclosure. Specifically, a more efficient heat flux in some regions of the heat sink are defined in order to more effectively cool components both in contact with the heat sink and within the larger computing system, e.g., the enclosure in which the heat sink resides.

Accordingly, each heat sink embodiment presented herein facilitates enhanced heat transfer from one or more heat sources through dynamically adjusting the heat transfer capabilities of the affected heat pipes automatically, thereby enhancing the dynamic modulating of the heat transfer capabilities of the respective heat sink devices. In the present disclosure, at least some of the embodiments described are directed toward heat removal from processing devices. However, in addition, the use of the systems and methods presented herein are adaptable to HVAC systems as energy recovery mechanisms and for thermal control of satellites and spacecraft.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A heat pipe system to enhance heat transfer from a heat-generating component, the heat pipe system comprising:
   one or more heat pipes, each heat pipe of the one or more heat pipes comprising:
      an outer shell;
      a wick structure coupled to the outer shell, wherein at least a portion of the wick structure defines a chamber therein, the chamber comprising an evaporator portion and a condenser portion; and
      one or more vapor blocking devices positioned in the chamber, wherein the one or more vapor blocking devices are configured to dynamically modify an active heat transfer region of the condenser portion, thereby dynamically modulate heat transfer through the condenser portion, and wherein the one or more vapor blocking devices comprises:
         one or more sleeves configured to at least partially insulate a portion of the condenser portion from at least a portion of a vapor flowing within the condenser portion, wherein the one or more sleeves comprises:
            one or more travel guides to traverse at least a portion of the chamber through one or more respective tracks positioned in the wick structure.

2. The heat pipe system of claim 1, further comprising:
   one or more modulating devices operably coupled to the one or more vapor blocking devices, wherein:
      at least a portion of the one or more modulating devices is at least partially external to the chamber; and
      the one or more modulating devices are configured to dynamically reposition the one or more vapor blocking devices within the chamber at least partially based on a temperature of the heat-generating component.

3. The heat pipe system of claim 1, wherein the one or more heat pipes comprises:
   a U-shaped heat pipe comprising:
      the evaporator portion thermally coupled to the heat-generating component; and
      two or more condenser portions coupled in fluid communication with the evaporator portion, wherein each condenser portion of the two or more condenser portions comprises the one or more vapor blocking devices.

4. The heat pipe system of claim 1, wherein the one or more sleeves comprises:
   a cylindrical configuration that defines a vapor flow path therethrough.

5. The heat pipe system of claim 1, wherein the one or more vapor blocking devices comprises:
   one or more valves configured to at least partially isolate at least a portion of the condenser portion from at least a portion of a vapor flowing through the condenser portion.

6. The heat pipe system of claim 5, wherein:
   the valve is positioned at a fixed location in the condenser portion, wherein a state of the valve is one of a binary open and closed.

7. The heat pipe system of claim 1, wherein the one or more vapor blocking devices comprises:
a blocking object configured to at least partially isolate at least a portion of the condenser portion from at least a portion of a vapor flowing through the condenser portion.

8. The heat pipe system of claim 7, wherein:
the blocking object comprises a spherical configuration, wherein a diameter of the blocking object is smaller than a diameter of the chamber.

9. The heat pipe system of claim 1, wherein the one or more vapor blocking devices are further configured to:
change, dynamically, a fill ratio within the chamber.

10. A method to enhance heat transfer from a heat-generating component comprising:
generating heat with the heat-generating component;
transferring at least a portion of the heat to at least a portion of a volatile fluid within one or more heat pipes, wherein the one or more heat pipes comprises:
an outer shell;
a wick structure coupled to the outer shell, wherein at least a portion of the wick structure defines a chamber therein, the chamber comprising an evaporator portion and a condenser portion; and
one or more vapor blocking devices positioned in the chamber, wherein the one or more vapor blocking devices are configured to dynamically modify an active heat transfer region of the condenser portion, thereby dynamically modulate heat transfer through the condenser portion, and wherein the one or more vapor blocking devices comprises:
one or more sleeves configured to at least partially insulate a portion of the condenser portion from at least a portion of a vapor flowing within the condenser portion, wherein the one or more sleeves comprises:
one or more travel guides to traverse at least a portion of the chamber through one or more respective tracks positioned in the wick structure; and
modifying, dynamically, an active heat transfer region of the one or more heat pipes, thereby dynamically modulating heat transfer from the heat-generating component through the one or more heat pipes.

11. The method of claim 10, wherein the modifying, dynamically, the active heat transfer region of the one or more heat pipes comprises:
repositioning, dynamically, within the one or more heat pipes, through one or more respective modulating devices, the one or more vapor blocking devices.

12. The method of claim 10, wherein the modifying, dynamically, the active heat transfer region of the one or more heat pipes comprises:
changing, dynamically, a fill ratio within the one or more heat pipes.

13. The method of claim 10, wherein the modifying, dynamically, the active heat transfer region of the one or more heat pipes comprises one or more of:
insulating, dynamically, at least a portion of the active heat transfer region of the one or more heat pipes, from at least a portion of a vapor flowing through the active heat transfer region.

14. The method of claim 10, wherein the modifying, dynamically, the active heat transfer region of the one or more heat pipes comprises one or more of:
isolating, dynamically, at least a portion of the active heat transfer region of the one or more heat pipes, from at least a portion of a vapor flowing through the active heat transfer region.

15. A heat sink system to enhance heat transfer from a heat-generating component comprising:
one or more heat pipes, each heat pipe of the one or more heat pipes comprising:
an outer shell;
a wick structure coupled to the outer shell, wherein at least a portion of the wick structure defines a chamber therein, the chamber comprising an evaporator portion and a condenser portion; and
one or more vapor blocking devices positioned in the chamber, wherein the one or more vapor blocking devices are configured to dynamically modify an active heat transfer region of the condenser portion, thereby dynamically modulate heat transfer through the condenser portion, and wherein the one or more vapor blocking devices comprises:
one or more sleeves configured to at least partially insulate a portion of the condenser portion from at least a portion of a vapor flowing within the condenser portion, wherein the one or more sleeves comprises:
one or more travel guides to traverse at least a portion of the chamber through one or more respective tracks positioned in the wick structure; and
one or more cooling fins thermally coupled to the one or more heat pipes.

16. The heat sink system of claim 15, further comprising:
one or more modulating devices operably coupled to the one or more vapor blocking devices, wherein:
at least a portion of the one or more modulating devices is at least partially external to the chamber; and
the one or more modulating devices are configured to dynamically reposition the one or more vapor blocking devices within the chamber at least partially based on a temperature of the heat-generating component.

17. The heat sink system of claim 15, wherein the one or more heat pipes comprises:
a U-shaped heat pipe comprising:
the evaporator portion thermally coupled to the heat-generating component; and
two or more condenser portions coupled in fluid communication with the evaporator portion, wherein each condenser portion of the two or more condenser portions comprises the one or more vapor blocking devices.

18. The heat sink system of claim 15, wherein the one or more sleeves comprise:
a cylindrical configuration that defines a vapor flow path therethrough.

19. The heat sink system of claim 15, wherein the one or more vapor blocking devices comprises:
one or more valves configured to at least partially isolate at least a portion of the condenser portion from at least a portion of a vapor flowing through the condenser portion, wherein the valve is positioned at a fixed location in the condenser portion, a state of the valve is one of a binary open and closed; and
a blocking object configured to at least partially isolate at least a portion of the condenser portion from at least a portion of the vapor flowing through the condenser portion, wherein the blocking object comprises a spherical configuration, a diameter of the blocking object is smaller than a diameter of the chamber.

* * * * *